(12) United States Patent
Gameiro et al.

(10) Patent No.: US 9,739,198 B2
(45) Date of Patent: Aug. 22, 2017

(54) OIL AND FUEL CIRCUITS IN A TURBINE ENGINE

(75) Inventors: Sebastien Gameiro, Paris (FR); Olivier Robert Michel Delepierre-Massue, Ozoir la Ferriere (FR)

(73) Assignee: SNECMA, Paris (FR)

( * ) Notice: Subject to any disclaimer, the term of this patent is extended or adjusted under 35 U.S.C. 154(b) by 604 days.

(21) Appl. No.: 14/343,185

(22) PCT Filed: Aug. 14, 2012

(86) PCT No.: PCT/FR2012/051904
§ 371 (c)(1),
(2), (4) Date: Mar. 6, 2014

(87) PCT Pub. No.: WO2013/034829
PCT Pub. Date: Mar. 14, 2013

(65) Prior Publication Data
US 2014/0223917 A1    Aug. 14, 2014

(30) Foreign Application Priority Data

Sep. 7, 2011 (FR) .................... 11 57953

(51) Int. Cl.
*F02C 7/14* (2006.01)
*F02C 7/12* (2006.01)
(Continued)

(52) U.S. Cl.
CPC ............. *F02C 7/12* (2013.01); *F01D 25/18* (2013.01); *F02C 7/14* (2013.01); *F02C 7/224* (2013.01);
(Continued)

(58) Field of Classification Search
CPC .......... F05D 2260/213; F05D 2260/20; F05D 2260/205; F01D 25/18; F02C 7/12;
(Continued)

(56) References Cited

U.S. PATENT DOCUMENTS

| 4,041,697 A | * | 8/1977 | Coffinberry | ............... F02C 7/14 |
| | | | | 123/41.33 |
| 4,151,710 A | | 5/1979 | Griffin et al. | |

(Continued)

FOREIGN PATENT DOCUMENTS

EP    1 857 638    11/2007

OTHER PUBLICATIONS

International Search Report Issued Dec. 3, 2012 in PCT/FR12/051904 Filed Aug. 14, 2012.
U.S. Appl. No. 14/770,681, filed Aug. 26, 2015, Gameiro, et al.

*Primary Examiner* — Brian D Nash
(74) *Attorney, Agent, or Firm* — Oblon, McClelland, Maier & Neustadt, L.L.P.

(57) ABSTRACT

Oil and fuel circuits in a turbine engine, the circuits including a main oil/fuel heat exchanger passing flows of oil and fuel for cooling the oil, an oil/air heat exchanger mounted in the oil circuit and having a flow of cooling air passing therethrough, a bypass pipe connected between an oil inlet and outlet of the oil/air heat exchanger, a valve for controlling passage of the oil flow through the bypass pipe and the oil/air heat exchanger, and a secondary oil/fuel heat exchanger mounted in the bypass pipe.

12 Claims, 2 Drawing Sheets

(51) Int. Cl.
*F01D 25/18* (2006.01)
*F02C 7/224* (2006.01)

(52) U.S. Cl.
CPC .... *F05D 2260/20* (2013.01); *F05D 2260/213* (2013.01); *Y02T 50/676* (2013.01)

(58) Field of Classification Search
CPC .. F02C 7/14; F02C 7/224; F02C 7/232; Y02E 20/36
USPC .................................................. 60/772, 730
See application file for complete search history.

(56) References Cited

U.S. PATENT DOCUMENTS

| 4,773,212 | A |  | 9/1988 | Griffin et al. |  |
|---|---|---|---|---|---|
| 5,121,598 | A | * | 6/1992 | Butler | F02C 7/14 60/39.08 |
| 5,615,547 | A | * | 4/1997 | Beutin | F02C 7/14 60/39.08 |
| 8,495,857 | B2 | * | 7/2013 | Papa | F02C 7/14 60/266 |
| 8,499,822 | B2 | * | 8/2013 | Bulin | F02C 7/14 165/41 |
| 9,038,397 | B2 | * | 5/2015 | Papa | F02C 7/14 60/266 |
| 9,097,169 | B2 | * | 8/2015 | Logan | F01P 9/00 |
| 2007/0264133 | A1 |  | 11/2007 | Schwarz et al. |  |
| 2009/0313999 | A1 | * | 12/2009 | Hunter | F01D 25/18 60/772 |
| 2014/0014198 | A1 | * | 1/2014 | de Wergifosse | F02C 7/06 137/340 |
| 2014/0033731 | A1 | * | 2/2014 | Rackwitz | F02C 9/28 60/776 |
| 2014/0223917 | A1 | * | 8/2014 | Gameiro | F01D 25/18 60/772 |

* cited by examiner

OIL AND FUEL CIRCUITS IN A TURBINE ENGINE

BACKGROUND OF THE INVENTION

Field of the Invention

The invention relates to oil and fuel circuits in a turbine engine such as an airplane turbojet or turboprop.

Description of the Related Art

It is known to connect the oil and fuel circuits via heat exchangers in order to avoid the oil for lubricating members such as rolling bearings from overheating, the oil being cooled by exchanging heat with the flow of fuel that is fed to injectors mounted in a combustion chamber and to servo-valves for controlling variable geometry members such as variable pitch vanes.

To this end, a main oil/fuel heat exchanger is used that is arranged in the oil and fuel circuits downstream or upstream relative to an oil/air heat exchanger mounted in the oil circuit for cooling the oil leaving the core of the turbine engine. The oil/air heat exchanger has a stream of air passing therethrough or thereover that comes from outside the turbine engine.

A bypass pipe is mounted on this heat exchanger between the oil inlet and outlet, and a control valve serves to control the flow rate of oil passing through the oil/air heat exchanger and along the bypass pipe so as to control the temperature of the oil leaving the oil/air heat exchanger and entering the main oil/fuel heat exchanger.

Under cold operating conditions, such as during airplane takeoff, the valve is controlled to divert the flow of oil to the bypass pipe, which flow of oil then flows through the main oil/fuel heat exchanger. In this way, the oil does not pass through the oil/air heat exchanger so it is not cooled, thereby enabling the fuel to be heated and making it possible to guarantee a minimum temperature for the fuel that is fed to the injectors and the servo-valves.

Under hot operating conditions, e.g. at the end of takeoff or at the beginning of a cruising stage, the valve causes oil to flow through the oil/air heat exchanger, thereby serving to cool the oil and thus avoiding the oil coking. The cooled oil then flows through the main oil/fuel heat exchanger and delivers a smaller quantity of heat to the fuel, thus avoiding the fuel coking in the fuel injectors.

That type of configuration for the oil and fuel circuits is nevertheless not entirely satisfactory. Under cold operating conditions, the capacity of the main heat exchanger for transferring heat from the oil flow to the fuel flow can be insufficient. In a cold environment, water present in the fuel circuit can freeze, thereby disturbing the feeding of fuel to the injectors in the combustion chamber and greatly disturbing the operation of the servo-valves controlling variable geometry members.

Proposals have already been made to add a secondary oil/fuel heat exchanger upstream from the oil/air heat exchanger in the oil flow direction for the purpose of heating the fuel that is used as hydraulic fluid for controlling the variable geometry members. In such a configuration, the secondary oil/fuel heat exchanger is mounted immediately downstream from the oil recovery pump that recovers oil from lubricated equipment so that the heat exchanger has hot oil passing therethrough in order to provide a good transfer of heat to the fuel flow. Since the flow rate of fuel used as hydraulic fluid is less than the flow rate of fuel passing through the main oil/fuel heat exchanger, it is thus easy to heat it and to eliminate any risk of freezing under cold conditions.

Nevertheless, under hot operating conditions, the secondary oil/fuel heat exchanger contributes significant heating to the fuel fed to the servo-valves, thereby increasing the risk of the fuel overheating and thus of the fuel coking.

Introducing a secondary oil/fuel heat exchanger in series with the main oil/fuel heat exchanger and the oil/air heat exchanger gives rise to an increase in head losses in the oil circuit. As a result the oil recovery pumps arranged upstream from the secondary oil/fuel heat exchanger are subjected to greater back pressure, which means that they need to be of greater dimensions and thus of greater weight in order to conserve the same performance.

The oil and fuel circuit configurations described above are described in patent applications FR 2 951 228 and FR 1 061 138 in the name of the Applicant.

BRIEF SUMMARY OF THE INVENTION

A particular object of the invention is to provide a solution to the above-mentioned problems that is simple, inexpensive, and effective, and that makes it possible to avoid the drawbacks of the prior art.

To this end, the invention provides oil and fuel circuits in a turbine engine, the circuits comprising a main oil/fuel heat exchanger passing flows of oil and fuel for cooling the oil, and an oil/air heat exchanger, mounted in the oil circuit and having a flow of cooling air passing therethrough, a bypass pipe connected between the oil inlet and outlet of the oil/air heat exchanger and a valve for controlling the passage of the oil flow through the bypass pipe and the oil/air heat exchanger, the circuits being characterized in that a secondary oil/fuel heat exchanger is mounted in the bypass pipe.

Under hot operating conditions, the valve causes oil to flow through the oil/air heat exchanger and limits or prevents any flow of oil along the bypass pipe and through the secondary oil/fuel heat exchanger. This avoids heating the fuel by transferring heat from the oil flow to the fuel flow, thus serving to reduce the risk of coking in the fuel leaving the secondary oil/air heat exchanger.

Under cold operating conditions, the valve causes the oil to flow along the bypass pipe through the secondary oil/fuel heat exchanger, thereby serving to heat the fuel fed to the servo-valves.

Arranging the secondary heat exchanger in the bypass pipe serves to decouple the function of cooling the fuel under hot operating conditions from the function of heating the fuel under cold operating conditions.

The invention also makes it possible to reduce head losses and the back pressure that is applied to the pump upstream from the heat exchangers, since there are only two heat exchangers in series whatever the operating conditions. Under hot conditions, only the main oil/fuel heat exchanger and the oil/air heat exchanger are in series in the oil circuit, while under cold conditions, only the main oil/fuel heat exchanger and the secondary oil/fuel heat exchanger are in series in the circuit.

According to another characteristic of the invention, the bypass pipe and the oil/air heat exchanger are connected by a common oil outlet to an oil inlet of the main oil/fuel heat exchanger. In this way, the oil fluid leaving the oil/air heat exchanger and the secondary oil/fuel heat exchanger flows directly through the main oil/fuel heat exchanger. By controlling the rate at which oil passes through the oil/air heat exchanger and the secondary oil/fuel heat exchanger it is thus possible to control the temperature of the oil entering the main oil/fuel heat exchanger and thus to control the temperature of the fuel leaving the main heat exchanger.

According to another characteristic of the invention, the control valve has the oil flow passing therethrough and is arranged upstream or downstream from the oil/air heat exchanger and the secondary oil/fuel heat exchanger.

The control valve may be a two-port valve or a three-port valve. This valve may be of the type having on/off operation or a valve in which the degree of opening/closing is variable.

Advantageously, the secondary oil/fuel heat exchanger passes a flow of fuel for feeding hydraulic pressure to variable geometry members, thus enabling the low flow rate of fuel that is fed to the variable geometry members to be heated in simple manner.

The invention also provides a turbine engine, such as an airplane turboprop or turbojet, and including oil and fuel circuits as described above.

The invention also provides a method of managing exchanges of heat between the oil and fuel circuits of a turbine engine as described above, the method consisting in controlling the control valve to prevent or allow the passage of oil through the secondary oil/fuel heat exchanger and through the oil/air heat exchanger as a function of the temperature of the oil.

Advantageously, the method consists in controlling the control valve to prevent the passage of oil through the secondary oil/fuel heat exchanger and to allow the passage of oil through the oil/air heat exchanger when the temperature of the oil is relatively high because of the operating conditions of the engine.

In this way, under hot operating conditions, the fuel passing through the secondary oil/fuel heat exchanger is not heated.

According to another characteristic of the invention, the method also consists in controlling the control valve to allow the passage of oil through the secondary oil/fuel heat exchanger and to prevent the passage of oil through the oil/air heat exchanger when the temperature of the oil is relatively very low because of the operating conditions of the engine. This avoids cooling the oil in the oil/air heat exchanger and enables the fuel to be heated sufficiently by means of the main and secondary heat exchangers.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
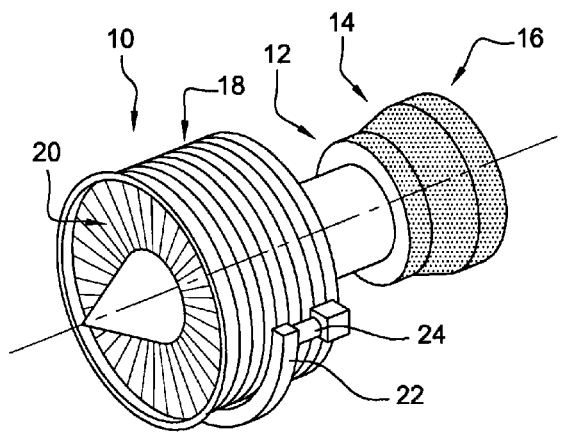
FIG. 1 is a diagrammatic perspective view of a turbine engine of known type.

In well-known manner to the person skilled in the art, a turbine engine 10 comprises a combustion chamber 12, with combustion gas from the chamber 12 driving a high pressure turbine 14 and a low pressure turbine 16. The high pressure turbine 14 is coupled by a shaft to a high pressure compressor 18 arranged upstream from the combustion chamber 12 and feeding it with air under pressure. The low pressure turbine 16 is coupled by another shaft to a fan 20 arranged at the upstream end of the engine 10.

An accessory gearbox 22 is connected via a mechanical takeoff 24 to the shaft of the high pressure turbine and contains gearing for driving various pieces of equipment of the engine, such as pumps and generators, in particular electricity generators.

Figure 2:
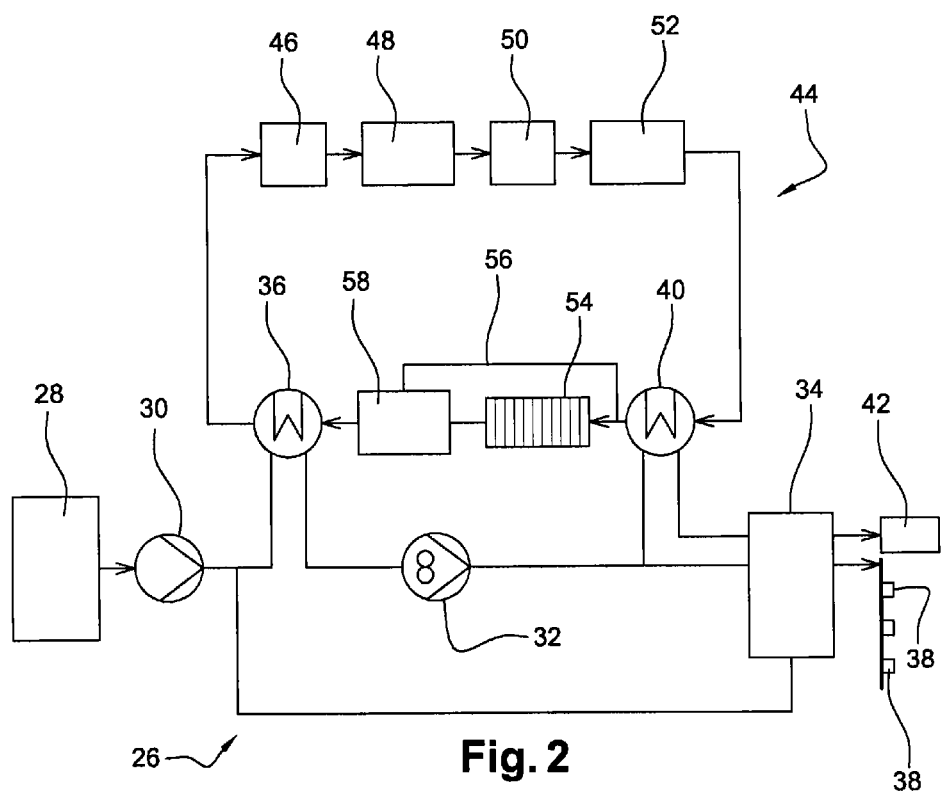
FIG. 2 is a circuit diagram showing part of the oil and fuel circuits in the prior art.

FIG. 2 shows the oil and fuel circuits of the FIG. 1 engine.

The fuel circuit 26 comprises, from upstream to downstream in the flow direction of the fuel: a fuel tank 28; a low pressure pump 30; a high pressure pump 32; and a fuel metering unit (FMU) 34. Between the low pressure pump 30 and the high pressure pump 32, the oil passes through a main oil/fuel heat exchanger 36. At the outlet from the high pressure pump 32, the flow of fuel is shared between a first fraction that is taken to the FMU 34 to deliver fuel at a regulated flow rate to injectors of the combustion chamber 12, and a second fraction that passes through a secondary oil/fuel heat exchanger 40. At the outlet from this secondary heat exchanger 40, the fuel is taken to the FMU 34, which feeds pressure to servo-valves 42 for controlling members of variable geometry, such as variable pitch guide vanes for a diffuser.

The oil circuit 44 comprises, from upstream to downstream in the oil flow direction: an oil tank 46; feed pumps 48 for feeding various assemblies 50 that use lubricating and/or cooling oil; and recovery pumps 52 for recirculating oil back to the tank 46.

In addition to the oil used for lubricating and cooling the engine, in particular the bearings of the turbine and compressor shafts, the total oil flow may include oil that is used for lubricating the accessory gearbox 22 and for lubricating and cooling one or more electricity generators.

At the outlet from the recovery pumps 52, the oil passes through the secondary oil/fuel heat exchanger 40 and then through an oil/air heat exchanger 54. A bypass pipe 56 is mounted in the oil circuit in parallel with the heat exchanger 54 and has an inlet arranged between the outlet from the secondary oil/fuel heat exchanger 40 and the inlet to the oil/air heat exchanger 54, and an outlet connected to a valve 58 connected at the outlet from the heat exchanger 54 for causing the oil to flow either in the bypass pipe 56 or through the oil/air heat exchanger 54. The control valve 58 is arranged upstream from the main oil/fuel heat exchanger 36. The oil leaving the main oil/fuel heat exchanger 36 then flows to the oil tank 46.

The oil/air heat exchanger 54 may be of the surface cooling type, i.e. having oil ducts that have a stream of cold air passing over them, which air comes from a bypass air stream of the engine, also referred to as a secondary air stream. By way of example, such a heat exchanger is housed on a wall of the channel for the secondary stream immediately downstream from the fan 20 (FIG. 1).

The oil/air heat exchanger 54 may also be of the air/oil plate type having a stream of air passing therethrough, which air is taken from the secondary air stream and is reinjected at the outlet from the heat exchanger back into the secondary air stream.

As mentioned above, under cold operating conditions, this configuration for the oil and fuel circuits makes provision for the oil leaving the recovery pump 52 to pass through the secondary oil/fuel heat exchanger 40, thus serving to heat the flow of fuel fed to the servo-valves 42 for controlling variable geometry members. In this configuration, the valve 58 is operated to prevent oil passing through the oil/air heat exchanger 54 so as to avoid excessively cooling the flow of oil. The oil thus flows along the bypass pipe 56 and passes through the main oil/fuel heat exchanger 36, serving to heat the fuel fed to the injectors 38 of the combustion chamber 12.

Nevertheless, under hot operating conditions, the hot oil leaving the recovery pump 52 flows through the secondary oil/fuel heat exchanger 40, thereby contributing to further heating the fuel, even though it would be preferable to limit the extent to which it is heated, and thereby increasing the risk of overheating and coking of the fuel that is fed to the servo-valve 52. Under such hot operating conditions, the valve 58 prevents oil from flowing through the bypass duct 56 so that the oil flows through the oil/air heat exchanger in order to cool the flow of oil, which then passes through the main oil/fuel heat exchanger 36 and cools the flow of fuel fed to the injectors 38.

Connecting the secondary oil/fuel heat exchanger 40 in series with the oil/air heat exchanger 54 and the main oil/fuel heat exchanger 36 gives rise to large head losses in the oil circuit, in particular under cold operating conditions when the bypass pipe 56 is shut off, with the oil passing in succession through the three heat exchangers 40, 54, and 36. These head losses give rise to considerable back pressure on the oil recovery pump 52. This back pressure corresponds to the sum of the following: the inlet pressure to the oil tank; the pressure difference between the inlet and the outlet of the primary oil/fuel heat exchanger 36; the pressure difference between the inlet and the outlet of the control valve 58; the pressure difference between the inlet and the outlet of the oil/air heat exchanger 54; and the pressure difference between the inlet and the outlet of the secondary oil/fuel heat exchanger 40. This back pressure requires the recovery pump 52 to be of considerable dimensions, thereby increasing the overall weight of the engine and possibly leading to the oil recovery pump losing priming.

Figure 3:
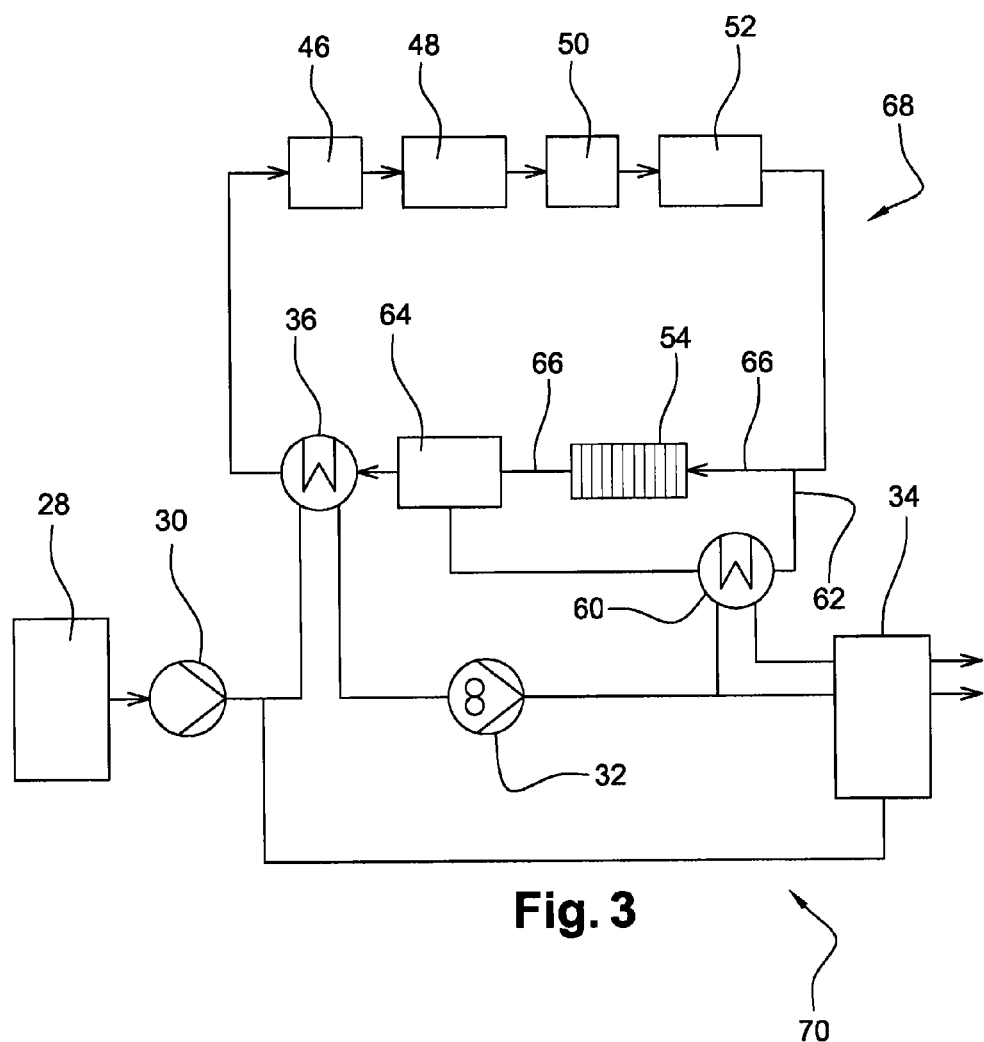
FIG. 3 is a circuit diagram showing part of the oil and fuel circuits in the invention.

The invention provides a solution to this problem by proposing mounting the secondary oil/fuel heat exchanger 60 in the bypass pipe 62 (FIG. 3).

In a manner similar to that described above with reference to FIG. 2, the secondary oil/fuel heat exchanger 60 is connected to receive an inlet flow of fuel and to deliver an outlet flow to the servo-valves 42 for controlling variable geometry members via the FMU 34.

Under hot operating conditions, typically with oil at a temperature of about 140° C., the valve 64 is controlled so as to prevent oil flowing through the secondary oil/fuel heat exchanger 60 and to allow oil to pass through the oil/air heat exchanger 54. This cooled oil then flows through the main oil/fuel heat exchanger 36, thereby limiting the heating of the fuel fed to the injectors 38 and to the servo-valves 42 controlling variable geometry members. Thus, under hot operating conditions, the hot oil no longer passes through the secondary oil/fuel heat exchanger 60, so it no longer heats the fuel fed to the servo-valves 42.

Under cold operating conditions, typically with oil at a temperature of about 60° C., the valve 64 is controlled so as to allow oil to flow along the bypass pipe 62 and to prevent oil from flowing through the oil/air heat exchanger 54, thereby enabling the fuel to be heated by the secondary oil/fuel heat exchanger 60.

Mounting the secondary oil/fuel heat exchanger 60 in the bypass pipe 62 in parallel with the oil/air heat exchanger 54 serves to reduce head loses in the oil circuit since, whatever the state of the control valve 64, there are only two heat exchangers that are arranged in series, and not three as in the prior art. Under cold operating conditions only the main heat exchanger 36 and the secondary heat exchanger 60 are connected in series, while under hot operating conditions, only the main oil/fuel heat exchanger 36 and the oil/air heat exchanger 54 are in series.

The valve 64 may be a two-port valve connected in the bypass pipe 62 between its inlet and the inlet to the secondary oil/fuel heat exchanger 60 or between the outlet of the bypass pipe 62 and the outlet of the secondary oil/fuel heat exchanger 60.

In a variant, the two-port valve may be mounted in the pipe 66 for passing oil from the oil/air heat exchanger 54 between the inlet of this pipe 66 and the inlet of the oil/air heat exchanger 54, or between the outlet of this pipe and the outlet from the oil/air heat exchanger 54.

In another variant embodiment of the invention, the valve 64 is a three-port valve connected upstream from the oil/air heat exchanger 54 and the secondary oil/fuel heat exchanger 60, the three-port valve connecting together the inlets of the oil/air heat exchanger 54 and of the secondary oil/fuel heat exchanger 60. Alternatively, the three-port valve may be mounted downstream from the oil/air heat exchanger 54 and the secondary oil/fuel heat exchanger 60, the three-port valve connecting together the outlets of the oil/air heat exchanger 54 and the secondary oil/fuel heat exchanger 60.

The valve 64 may be a valve with on/off operation, so that it closes or opens completely the flow of oil from one of the oil/air heat exchangers 54 and the secondary oil/fuel heat exchanger 60, and respectively so that it opens or closes completely the flow of oil from the other one of the oil/air heat exchanger 54 and the secondary oil/fuel heat exchanger 60.

The valve 64 may also be a valve that is controlled to vary the degree to which it is open/closed. Such a valve may be a two-port valve or a three-port valve as described above.

Opening and closing the valve 64 so as to allow or prevent the passage of oil through the secondary oil/fuel heat exchanger 60 and the oil/air heat exchanger 54 is controlled as a function of the temperature of the oil. For this purpose, a temperature probe is mounted between the feed pump 48 and the assemblies 50 that are to receive lubricating and cooling oil. The measured temperature value of the oil is transmitted to a computer and also to a display device in the cockpit of the airplane.

When the oil temperature is higher than a temperature T1 of about 120° C., the valve 64 is controlled to prevent oil to flow along the bypass pipe 62 so the oil then flows through the oil/air heat exchanger 54.

When the temperature of the oil is lower than a temperature T2 of about 30° C., the valve 64 is controlled so as to prevent oil passing through the oil/air heat exchanger 54, oil then passing along the bypass pipe through the secondary oil/fuel heat exchanger 60.

For temperature values lying in the range T1 to T2, and when the valve 64 is a valve with a variable degree of opening, it can be advantageous to adjust the degree to which the valve 64 is opened/closed in order to control the flow rate of oil through the secondary oil/fuel heat exchanger 60 and through the air/oil heat exchanger 54. This makes it possible to obtain better control over the temperatures of the oil and of the fuel.

The valve 64 may also be a thermostatic valve having a temperature sensitive probe that expands and contracts as a function of temperature. The temperature sensitive probe is designed to open or close the valve at a predetermined temperature threshold value so as to open or close the flow of oil through the secondary oil/fuel heat exchanger 60 and through the air/oil heat exchanger 54.

Without going beyond the ambit of the invention, it is possible to mount the two oil/fuel heat exchangers 36 and 60 and the oil/air heat exchanger 54 and the valve 64 in a configuration of the invention between the outlet of the feed pumps 48 and the inlet of the assemblies 50 receiving lubricating and cooling oil, the principle on which the assembly constituted by the oil circuits 68 and the fuel circuits 70 operates remaining identical to that described with reference to FIG. 3.

The invention claimed is:

1. Oil and fuel circuits in a turbine engine, the circuits comprising:
    a main oil/fuel heat exchanger passing flows of oil and fuel for cooling the oil;
    an oil/air heat exchanger mounted in the oil circuit and having a flow of cooling air passing therethrough;
    a bypass pipe connected between an oil inlet and outlet of the oil/air heat exchanger;
    a control valve for controlling passage of the oil flow through the bypass pipe and the oil/air heat exchanger; and
    a secondary oil/fuel heat exchanger mounted in the bypass pipe.

2. Oil and fuel circuits according to claim 1, wherein the bypass pipe and the oil/air heat exchanger are connected by a common oil outlet to an oil inlet of the main oil/fuel heat exchanger.

3. Oil and fuel circuits according to claim 1, wherein the control valve has the oil flow passing therethrough and is arranged upstream or downstream from the oil/air heat exchanger and the secondary oil/fuel heat exchanger.

4. Oil and fuel circuits according to claim 1, wherein the control valve is a two-port valve or a three-port valve.

5. Oil and fuel circuits according to claim 1, wherein the control valve is an on/off operation type valve or a valve in which a degree of opening/closing is variable.

6. Oil and fuel circuits according to claim 1, wherein the secondary oil/fuel heat exchanger passes a flow of fuel for feeding hydraulic pressure to variable geometry members.

7. A turbine engine, an airplane turboprop, or a turbojet, comprising oil and fuel circuits according to claim 1.

8. Oil and fuel circuits according to claim 1, wherein the fuel circuit comprises, from upstream to downstream in a flow direction of fuel, a fuel tank, a low pressure pump, a high pressure pump, and a fuel metering unit, the fuel passing through the main oil/fuel heat exchanger between the low pressure pump and the high pressure pump, and at an outlet of the high pressure pump, a flow of fuel is shared between a first fraction that flows to the fuel metering unit and a second fraction that passes through the secondary oil/fuel heat exchanger.

9. Oil and fuel circuits according to claim 8, wherein the second fraction of the flow of fuel flows to the fuel metering unit after passing through the secondary oil/fuel heat exchanger.

10. A method of managing exchanges of heat between oil and fuel circuits of a turbine engine, the circuits comprising a main oil/fuel heat exchanger passing flows of oil and fuel for cooling the oil; an oil/air heat exchanger mounted in the oil circuit and having a flow of cooling air passing therethrough; a bypass pipe connected between an oil inlet and outlet of the oil/air heat exchanger; a control valve for controlling passage of the oil flow through the bypass pipe and the oil/air heat exchanger; and a secondary oil/fuel heat exchanger mounted in the bypass pipe, the method comprising:
    controlling the control valve to prevent or allow the passage of oil through the secondary oil/fuel heat exchanger and through the oil/air heat exchanger as a function of a temperature of the oil.

11. A method according to claim 10, further comprising controlling the control valve to prevent the passage of oil through the secondary oil/fuel heat exchanger and to allow the passage of oil through the oil/air heat exchanger when the temperature of the oil is higher than a predetermined temperature.

12. A method according to claim 10, further comprising controlling the control valve to allow the passage of oil through the secondary oil/fuel heat exchanger and to prevent the passage of oil through the oil/air heat exchanger when the temperature of the oil is lower than a predetermined temperature.

* * * * *